(12) United States Patent
Laschi

(10) Patent No.: US 10,534,970 B2
(45) Date of Patent: Jan. 14, 2020

(54) SYSTEM AND METHOD FOR READING DIRECT PART MARKING (DPM) CODES ON OBJECTS

(71) Applicant: Datalogic IP Tech S.R.L., Calderara di Reno, Bologna (IT)

(72) Inventor: Nicoletta Laschi, Bologna (IT)

(73) Assignee: Datalogic IP Tech S.R.L., Calderara di Reno, Bologna (IT)

( * ) Notice: Subject to any disclaimer, the term of this patent is extended or adjusted under 35 U.S.C. 154(b) by 67 days.

(21) Appl. No.: 15/539,515

(22) PCT Filed: Dec. 24, 2014

(86) PCT No.: PCT/IT2014/000347
§ 371 (c)(1),
(2) Date: Jun. 23, 2017

(87) PCT Pub. No.: WO2016/103285
PCT Pub. Date: Jun. 30, 2016

(65) Prior Publication Data
US 2018/0018530 A1    Jan. 18, 2018

(51) Int. Cl.
*G06K 9/20* (2006.01)
*G06K 9/18* (2006.01)

(52) U.S. Cl.
CPC ............. *G06K 9/2036* (2013.01); *G06K 9/18* (2013.01); *G06K 9/209* (2013.01); *G06K 9/2027* (2013.01); *G06K 2209/19* (2013.01)

(58) Field of Classification Search
CPC ........ G06K 9/2036; G06K 9/209; G06K 9/18; G06K 9/2027; G06K 2209/19
See application file for complete search history.

(56) References Cited

U.S. PATENT DOCUMENTS

| | | | | |
|---|---|---|---|---|
| 6,714,665 | B1 * | 3/2004 | Hanna | G06K 9/00 382/106 |
| 7,201,321 | B2 * | 4/2007 | He | G06K 7/10722 235/462.05 |
| 8,028,913 | B2 * | 10/2011 | Liu | G06K 7/10722 235/455 |
| 8,165,357 | B2 * | 4/2012 | Rowe | G06K 9/00046 340/5.53 |
| 8,442,297 | B2 * | 5/2013 | Tyler | G06K 19/00 382/140 |
| 8,672,227 | B2 * | 3/2014 | Nunnink | G06K 7/10732 235/462.25 |
| 8,690,063 | B2 | 4/2014 | Wang et al. | |
| 9,367,725 | B2 * | 6/2016 | Negro | G06K 7/10722 |

(Continued)

OTHER PUBLICATIONS

Anonymous, "Image rectification—Wikipedia, the free encyclopedia," Dec. 12, 2014; retrieved from the Internet: www.wikipedia.org/image_rectification.

(Continued)

*Primary Examiner* — Mia M Thomas
(74) *Attorney, Agent, or Firm* — Dentons US LLP

(57) ABSTRACT

A system and method of inspection may include capturing image data by a stereo imaging device. A determination as to whether noise indicative of a transparent or specular object exists in the image data may be made. A report that a transparent or specular object was captured in the image data may be made.

24 Claims, 4 Drawing Sheets

(56) References Cited

U.S. PATENT DOCUMENTS

| | | | | |
|---|---|---|---|---|
| 9,367,952 B2* | 6/2016 | Gordon | | G01B 11/25 |
| 9,552,506 B1* | 1/2017 | Nadabar | | G06K 7/1447 |
| 9,773,304 B2* | 9/2017 | Mayumi | | G01N 21/8803 |
| 9,786,101 B2* | 10/2017 | Ackley | | G06K 9/18 |
| 9,829,309 B2* | 11/2017 | Ge | | G01B 11/22 |
| 9,915,827 B2* | 3/2018 | Gordon | | G01C 3/02 |
| 10,168,146 B2* | 1/2019 | Tin | | G01B 11/2513 |
| 10,257,498 B2* | 4/2019 | Cronie | | G01B 11/2513 |
| 2002/0165638 A1* | 11/2002 | Bancroft | | A47F 10/00 |
| | | | | 700/213 |
| 2005/0011956 A1* | 1/2005 | Carlson | | G06K 7/10732 |
| | | | | 235/462.42 |
| 2007/0186417 A1* | 8/2007 | Smyth | | G06K 7/14 |
| | | | | 29/894 |
| 2008/0077511 A1* | 3/2008 | Zimmerman | | G06Q 10/00 |
| | | | | 705/28 |
| 2010/0315336 A1* | 12/2010 | Butler | | G06F 3/017 |
| | | | | 345/158 |
| 2011/0102550 A1* | 5/2011 | Daniel | | G06T 7/55 |
| | | | | 348/46 |
| 2011/0224902 A1* | 9/2011 | Oi | | G06F 17/30241 |
| | | | | 701/300 |
| 2012/0067955 A1* | 3/2012 | Rowe | | G06K 7/12 |
| | | | | 235/454 |
| 2013/0011065 A1* | 1/2013 | Yoshida | | G06F 3/0317 |
| | | | | 382/187 |
| 2013/0258353 A1* | 10/2013 | Kosmecki | | A61B 1/00057 |
| | | | | 356/616 |
| 2013/0292478 A1* | 11/2013 | Wang | | G06K 7/10712 |
| | | | | 235/472.01 |
| 2014/0247116 A1* | 9/2014 | Davidson | | G06Q 10/087 |
| | | | | 340/10.1 |
| 2014/0379613 A1* | 12/2014 | Nishitani | | G06Q 30/0283 |
| | | | | 705/400 |
| 2015/0023588 A1* | 1/2015 | Barone | | G06T 7/593 |
| | | | | 382/154 |
| 2015/0043770 A1* | 2/2015 | Chen | | G06K 9/00208 |
| | | | | 382/103 |
| 2015/0227554 A1* | 8/2015 | Oi | | G06F 17/30241 |
| | | | | 345/520 |
| 2015/0360501 A1* | 12/2015 | Van Den Berg | | B42D 25/309 |
| | | | | 283/77 |
| 2017/0206691 A1* | 7/2017 | Harrises | | G06T 11/60 |
| 2018/0005176 A1* | 1/2018 | Williams | | G06Q 10/087 |
| 2018/0249143 A1* | 8/2018 | Calpe Maravilla | | H04N 13/271 |
| 2019/0005068 A1* | 1/2019 | Oi | | G06F 17/30241 |

OTHER PUBLICATIONS

Moqqaddem, Safaa, et al., "Objects Detection and Tracking Using Points Cloud Reconstructed from Linear Stereo Vision," in "Current Advancements in Stereo Vision," Jul. 11, 2012, pp. 161-179.

He, Xing-Fei, "Trilinear Cameras Offer High-Speed Color Imaging Solutions," Phtonics Spectra, May 5, 2013, retrieved from https://www.photonics.com/Article.aspx?AID=53763, 9 pages.

International Search Report for PCT/IT2014/000347, dated Aug. 26, 2015, 3 pages.

Peng, Zhao et al., "Simultaneous perimeter measurement for 3D object with a binocular stereo vision measurement system," Optics and Lasers in Engineering 48, 2010, pp. 505-511.

Hua, Xijun et al., "Stereo Vision from Color Images Based on Competitive and Cooperative Neural Networks," International Conference on Control Robotics Society, vol. 17, No. 10, pp. 435-443.

* cited by examiner

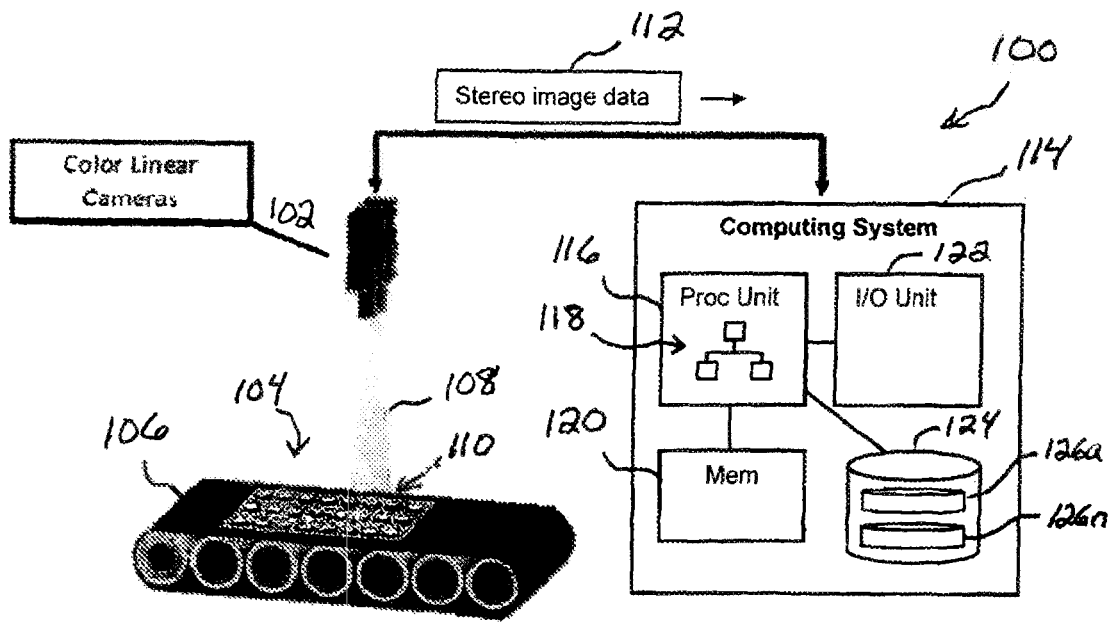
FIG. 1  System architecture.
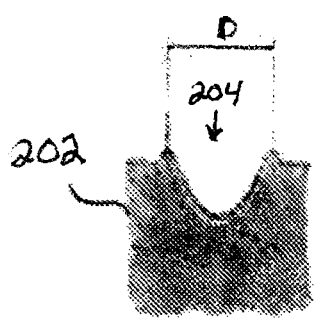
FIG. 2
(PRIOR ART)
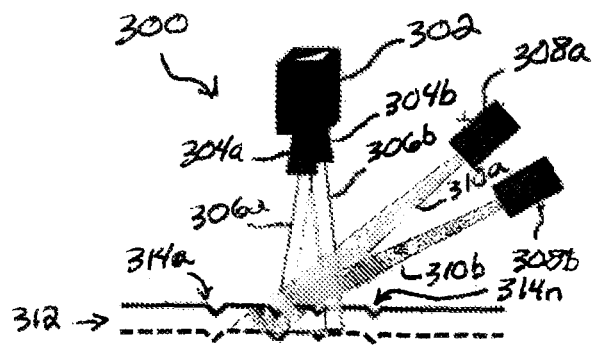
FIG. 3
FIG. 4
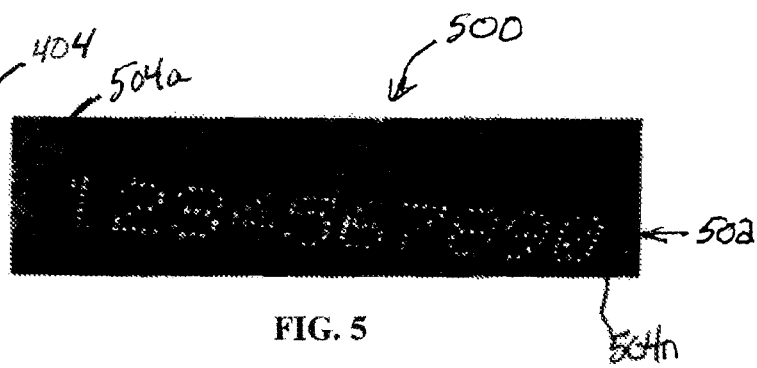
FIG. 5

SYSTEM AND METHOD FOR READING DIRECT PART MARKING (DPM) CODES ON OBJECTS

CROSS REFERENCE TO RELATED APPLICATIONS

This application is a 371 National Stage Application of International Application No. PCT/IT2014/000347, filed Dec. 24, 2014, which is incorporated herein by reference in its entirety.

BACKGROUND

Direct part marketing (DPM) produces a machine and/or human readable marking directly on a part or product where alternative the marking techniques are difficult, not possible, or not practical. As understood in the art, DPM is often used for quality, identification, inspection, safety, and other reasons. Marking metal parts, such as automobile or machinery parts, may lend themselves best to DPM as stickers or other markings may interfere or fall off during an assembly process.

As another example, medicines, such as pills, may also lend themselves best to DPM as there are basically no alternatives due to size and shape of the medicines.

DPM can be performed using a number of techniques. One technique for performing DPM on metal parts is to use dot peen marking. Dot peen marking includes producing indentations on a surface of a part (see FIG. 2) with a pneumatically or electromechanical driven pin or stylus. The dot size and imaging appearance are determined mostly by the stylus cone angle, marking force, material hardness, and illuminator used when imaging. The readability of dot peen marked symbols depends strongly on the resulting shape, size, and spacing of the dot and also by reflections due to an illuminator. In production lines, imaging the parts to identify DPMs on parts can be challenging due to speed and imaging quality specifications and requirements.

Existing systems that read DPM codes use certain 2D imaging processes and 3D imaging processes, including laser displacement imaging, laser triangulation imaging, time-of-flight (TOF) sensing, image differencing, and other imaging and image processing techniques. These imaging and image processing techniques, however, have various shortcomings due to reflections, loss of color, loss of other physical characteristics, and other shortcomings that cause DPM reading to be difficult to use in practice.

SUMMARY

An inspection system inclusive of a stereo imaging device may be utilized to perform inspection and/or identification of direct product marking (DPM) codes on objects, such as those produced in high production rate environments. In one embodiment, the stereo imaging device may include linear cameras that operate at high image capture rates. Image data collected from the stereo imaging device may be processed in real-time so as to enable inspection at high rates and/or at high reliability. In one embodiment, processing of the stereo image data may include a height map, depth map, and/or disparity map that uses a grayscale to represent relative distance of objects from the stereo imaging device or captured in respective stereo images. The use of the depth map reduces or eliminates reflection problems that may otherwise exist due to lighting of the DPM code on the object. The linear cameras may also be configured to capture color, which may be helpful in performing certain inspections.

One embodiment of a method of inspection may include capturing stereo image data inclusive of a DPM code on an object. The captured stereo image data may be rectified to produce rectified image data from the captured stereo image data. A depth map inclusive of the DPM code from the rectified image data may be generated, and the DPM code may be read from the depth map.

One embodiment of an inspection system may include a stereo imaging device configured to capture stereo image data inclusive of a DPM code on an object, and a processing unit in communication with the stereo imaging device. The processing unit may be configured to (i) rectify the captured stereo image data to produce rectified image data from the captured stereo image data, (ii) generate a depth map inclusive of the DPM code from the rectified image data, and (iii) read the DPM code from the depth map.

BRIEF DESCRIPTION OF THE DRAWINGS

Illustrative embodiments of the present invention are described in detail below with reference to the attached drawing figures, which are incorporated by reference herein and wherein:

FIG. 1 is an illustration of a system architecture for inspecting objects to image DPM codes on objects;

FIG. 2 is an illustration of an illustrative dot peen marking applied to an object;

FIG. 3 is an illustration of an illustrative inspection station with illustrative lighting that may be used to illuminate a DPM code on an object;

FIG. 4 an illustration of an illustrative object inclusive of an illustrative DPM code on the object with a reflective surface;

FIG. 5 is an illustration of an object with another illustrative DPM code formed by dot peen markings embodied on the object;

DETAILED DESCRIPTION OF THE DRAWINGS

Figure 6:
FIG. 6 is an illustration of an illustrative metal object inclusive of a DPM code formed using a dot peening process.

With regard to FIG. 1, an illustration of illustrative system architecture 100 for scanning objects to image DPM codes on objects is shown. The system architecture 100 may include a stereo imaging device 102 used to capture image data, and may be a pair of cameras configured to capture image data in a stereo manner, as understood in the art. In one embodiment, the stereo imaging device 102 are linear cameras, such as color linear cameras, which may operate at high data acquisition rates. Linear cameras acquire the image of a surface line-by-line, exploiting a relative motion between the camera system and the object to be imaged. Alternatively, two-dimensional (2D) or matrix cameras may be utilized. However, the use of linear cameras, which have a single array of image sensors, operate at higher speeds than 2D cameras, thereby enabling real-time image capturing for certain applications, such as pill inspection systems. The use of linear cameras with color capture capability may provide additional functionality for determining DPM codes, where the DPM codes may be human or machine readable.

In one embodiment, the stereo imaging device 102 may have imaging specifications, as follows: (i) height or Z resolution of 7 μm, (ii) optical or X, Y resolution of 30 μm per pixel, (iii) 3.5 kilo pixels, (iv) field-of-view width of 105 mm, (v) working distance of 200 mm, and (vi) linescan rate of 21 kHz (0.63 m/s). The use of linear cameras enable very high resolution 3D reconstructions in real-time, which may be used in forming depth maps or 3D representations of objects in the stereo images.

The stereo imaging device 102 may be positioned to image objects 104, such as metal objects, wooden objects, pills, or any other object, on which DPM codes may be applied. In one embodiment, a conveyor belt 106 may be utilized to transport or move the objects 104 through a field-of-view of the stereo imaging device such that imaging 108 of the objects 104 may be performed. The imaging 108 make capture objects 104 within a scene 110 of the stereo imaging device 102. In the event that the stereo imaging device 102 is a linear camera, then the array of pixels may capture a single scan line as the conveyor belt 106, or other motion equipment, moves the objects 104 across the field-of-view of the stereo imaging device 102.

The stereo imaging device 102 may communicate stereo image data 112 to a computer system 114. The stereo image data 112 may be one or more data streams or data sets of images captured by the stereo imaging device 102, which may include a pair of cameras.

The computing system 114 may include a processing unit 116, which may include one or more computer processors, general purpose, image processing, signal processing, etc., that executes software 118 for performing image, signal, or any other data processing. The processing unit 116 may be in communication with memory 120 configured to store data and/or software code, input/output (I/O) unit 122 configured to communicate with the stereo imaging device 102 and/or any other device or communications network, and storage unit 124, which may be configured to store one or more data repository 126a-126n (collectively 126). The data repositories 126 may be configured to store data collected from stereo imaging the objects 104 in a real-time manner or data processed from the stereo image data 112 resulting as processed by the processing unit 116, as further described herein. Moreover, the data repositories 126 may store template data, such as DMP codes, that may be used to determine object types by comparing DPM codes on objects scanned with the template data. Although shown as an imaging station, it should be understood that an alternative embodiment may include a handheld device or other system configuration used to image and read DMP codes on objects.

In operation, the computing system 114 may receive stereo image data 112 from the stereo imaging device 102, and determine DPM codes formed on the objects 104, and generate a report, which may be an image, text, data signal, and/or otherwise, such that the system architecture 100 operates as an inspection system for quality control or other purpose.

With regard to FIG. 2, an illustration of an object 202 with an illustrative dot peen marking 204 is shown. The dot peen marking 204 is shown as an indent with a hyperbolic curve within the dot peen marking 204 having a distance D at the surface of the object 202. Alternative shaped curves may also be utilized. In the case of the object 202 being metallic, the surface defined by the hyperbolic curve within the dot peen marking 204 may be reflective such that an illumination source that illuminates the dot peen marking 204 may cause an image of the dot peen marking 204 to be difficult to image and identify. Moreover, in the event of multiple dot peen markings being closely spaced, multiple reflections may further make imaging difficult to neighboring dot peen markings (not shown) to the dot peen marking 204.

With regard to FIG. 3, an illustration of an illustrative inspection station 300 with illustrative lighting that may be used to illuminate a DPM code on an object is shown. The inspection station 300 may be configured to inspect, measure, record, count, or perform any other function capable of being performed when imaging or post-imaging DPM codes on objects. A stereo imaging device 302 may include a pair of cameras 304a and 304b that may have a known alignment with one another for performing stereo imaging, as understood in the art.

In one embodiment, a thin line illumination system, as understood in the art, inclusive of one or more thin line illumination devices 308a and 308b (collectively 308) may be used. The thin line illumination devices 308 may provide a thin strip or line of light to illuminate a narrow region of the object with bright light as a linear camera has a single line of pixels. The illumination devices 308 may be inclined at a variable angle so as to project a thin line of illumination onto indentations of the dot peened markings that form a DPM code on the object. The illustrated configuration of the illumination devices 308 may be configured to produce a pattern of shadows that increases the capability of a stereo matching algorithm to detect depth from a combination of the 2D images performed by the stereo matching algorithm.

The angle of incidence of the thin illumination line created by the illumination devices 308 can be adjusted according to distance from the stereo imaging device 302 to a surface and the type of surface of the object (not shown). A width of the thin line of light can be positioned so as to ensure that the thin line of light is still in the field-of-view of the cameras 304 throughout an entire working depth of focus distance. In one embodiment, color of the illumination devices 308 may be selectably varied so as to provide for alternative lighting colors as some colors of light enable stereo imaging and 3D reconstruction processes or rectification of stereo images to perform better than other colors of light for different surfaces of materials, angles, etc. The illumination devices 308 may include lighting elements (not shown), such as light emitting diodes (LEDs), halogen bulbs, or any other illumination device(s) selectably capable of producing one or more frequencies of light. In one embodiment, multiple illumination lighting elements capable of generating respective different frequencies of light may be included in the illumination devices 308 and be selectably turned ON and OFF. In one embodiment, one or more frequencies of light may be used to create the thin strip of light, and the color of illumination may vary in different images of the same object for processing purposes. Color of the illumination device(s) may be controlled to be in one or more successive colors or wavelengths to be captured for processing. The controlling may be based on part type, surface type, color, or any other characteristic on which a DPM code is disposed. In one embodiment, images of a DPM code on a part may be collected as illuminated by each of the different colors or wavelengths, and stereo images that provide a highest contrast for reading the DPM code may be selected for processing.

With regard to FIG. 4, an illustration of an illustrative object 400 inclusive of an illustrative DPM code 402 on the object is shown. The DPM code 402 is configured as a machine readable code, where certain dot configurations may represent information identifiable by a computer algorithm, as understood in the art. The object 400 may have a surface that is reflective and causes a reflection 404 (i) from lighting used to illuminate the DPM code 402 and/or (ii) from ambient light in which the object 400 is being imaged. The reflection 404 generally causes difficulty in imaging and determining the DPM code 402, especially if using image processing techniques of 2D images, 3d reconstruction algorithms, and other image processing algorithms.

With regard to FIG. 5, an illustration of an object 500 with another illustrative DPM code 502 formed by dot peen markings 504a-504n (collectively 504) embodied on the object is shown. The DPM code 502 is human readable alphanumeric characters, in this case numbers '1' through '0'. The dot peen markings 504, which are illuminated with a bright light, may be reflective due to a surface material being metallic or simply reflective, as further shown in FIGS. 7A and 7B.

With regard to FIG. 6, an illustration of an illustrative metal object 600 inclusive of a DPM code 602 formed using a dot peening process is shown. The DPM code 602 is machine readable, and the dot peen markings or indents are spaced close to one another.

Figures 7A, 7B:
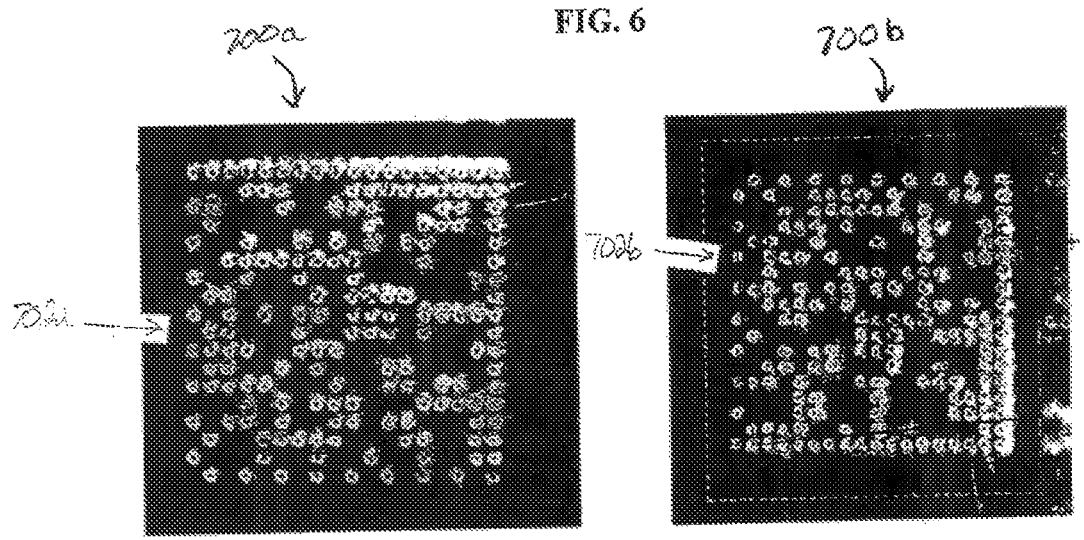
FIGS. 7A and 7B are illustrations of images resulting from a 2D image capture that show how reflections from the metal object of FIG. 6 can be problematic for imaging and determining the DPM code.

With regard to FIGS. 7A and 7B, illustrations of images 700a and 700b resulting from a 2D image capture that show how reflections from the metal object of FIG. 6 can be problematic for determining an image 602' of the DPM code 602 are shown. That is, the dot peen markings used to form the DPM code 602 is shown to be reflective in the image 602' of the DPM code 602. As an example, the top row of the image 602' of the DPM code 602 of the image 700a and the right column of the image 700b are shown to be highly reflective to the point that difficulty in determining information represented by the DPM code 602 exists for image processing algorithms to determine the information.

Figures 8A, 8B:
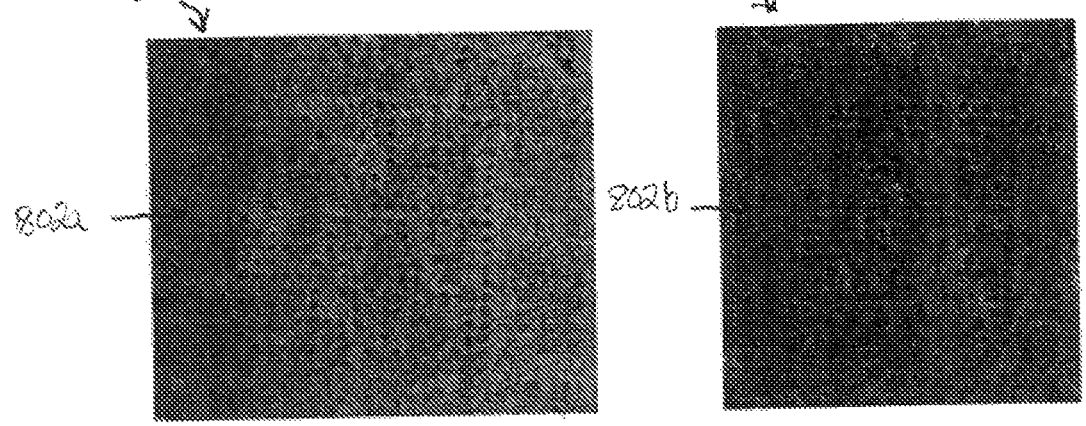
FIGS. 8A and 8B are illustrations of images resulting from a stereo image capture and image processing that show how reflections from the metal object of FIG. 6 are reduced or eliminated for determining the DPM code.

With regard to FIGS. 8A and 8B, illustrations of images 800a and 800b resulting from a stereo image capture and image processing that show how reflections from the metal object of FIG. 6 are reduced or eliminated for determining the DPM code 602 of FIG. 6 are shown. In forming the images 808a and 800b, a stereo imaging process may be performed along with 3D reconstruction and depth map generation may be utilized. The depth map generation algorithm utilizes distance of an object from stereo images to determine intensity of pixels mapped onto the depth map. In one embodiment, pixels representative of closer objects are assigned a lighter intensity value and pixels of the image representative of farther objects are assigned a darker intensity value. In the case of imaging an object with dot peen markings, the surface of the object is represented with a light intensity value and the bottom of the dot peen markings is represented with a dark intensity value, thereby causing the pixels representative of the dot peen markings to contrast from the surface of the object. By using a depth map (or disparity map), reflection from a surface of an object, such as that shown in FIG. 6, is reduced or eliminated, as visible when comparing the DPM codes 702a and 702b of FIGS. 7A and 7B with the DPM codes 802a and 802b of FIGS. 8A and 8B.

As shown by comparing the DPM codes 802a and 802b, more contrast exists in the image 800b than in the image 800a. In one embodiment, more contrast may be applied between closer and farther surfaces, thereby causing the dot peen markings to be more enhanced than if less contrast is used. In one embodiment, lighting differences from source lighting may also help define depth of dot peen markings being captured in a stereo image and 3D reconstructed. In one embodiment, color information from the stereo images may be utilized to further assist in defining edges of the dots in the DPM codes 802a and 802b in the images 800a and 800b, as understood in the art.

Figures 9A, 9B, 9C:
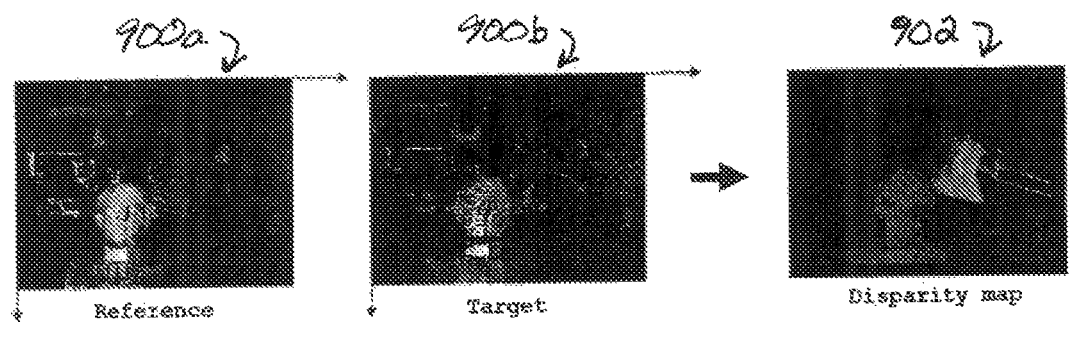
FIGS. 9A and 9B are illustrations of illustrative reference and target scenes, respectively, of a room with objects that range in distance from a stereoscopic imaging device.
FIG. 9C is an illustration of an illustrative disparity map from the image data of the scenes of FIGS. 9A and 9B, where the disparity map uses grayscale values in pixels to represent distance of objects in the scene of FIGS. 9A and 9B.

With regard to FIGS. 9A and 9B, illustrations of reference and target scenes 900a and 900b, respectively, of a scene of a room with objects that range in distance from a stereoscopic imaging device are shown. The reference scene 900a may be captured from a left camera and the target scene 900b may be captured from a right camera. A disparity map 902 or alternatively a depth map may be produced. As understood in the art, a disparity map provides a distance between two corresponding points in a left and right image of a stereo pair of images. Because the two cameras, and hence the two figures, are configured to be coplanar, creating the disparity map is a linear function (i.e., along a single axis). That is, the stereo image data of the two images 900a and 900b may be mapped to be in a common map coordinate system. Using the reference and target images 900a and 900b to perform image matching, each pixel results in a distance or disparity value between the two images. The use of rectification of the images (i.e., aligning the images to be coplanar using mechanical and, optionally, software alignment mapping) enables fast disparity matching.

With regard to FIG. 9C, an illustration of an illustrative depth map from a 3D reconstruction of image data, where the depth map uses grayscale to represent distance of objects in the scene of FIGS. 9A and 9B is shown. As previously described, darker pixels represent objects that are farther away from the stereo imaging device and are determined by having less distance between the matching pixels, while lighter pixels represent object that are closer to the stereo imaging device and are determined by having larger distance between the matching pixels. Such a distance principle may be understood by alternating opening and closing one's eyes and seeing how closer objects shift more than farther objects. A minimum intensity value (e.g., black) for a pixel may be set based on a maximum depth of a DPM marking on an object, while a maximum intensity value (e.g., white) for a pixel may be set based on measuring a surface of the object. Other maximum and minimum settings may be used, as well.

Figures 10A, 10B, 10C:
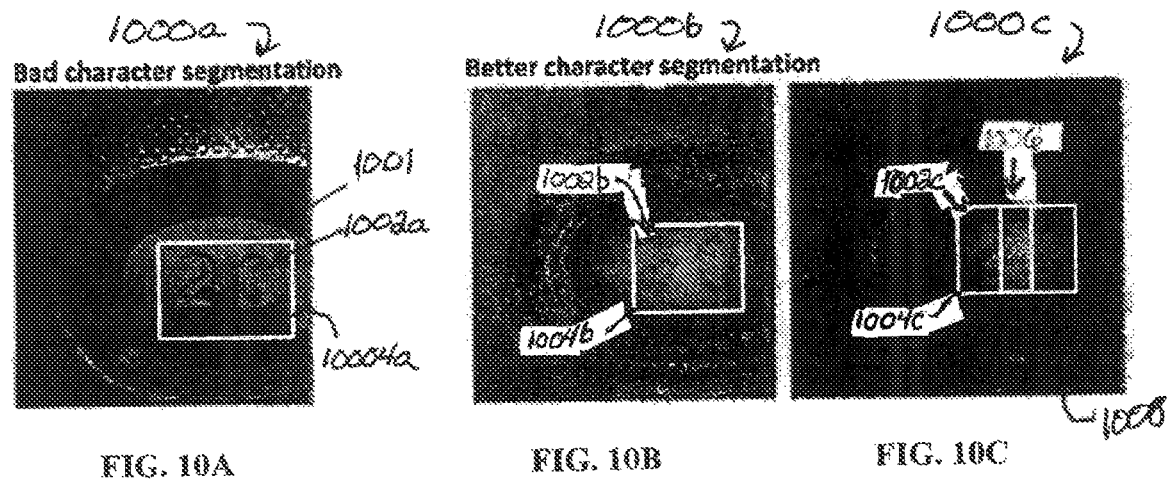
FIGS. 10A, 10B, and 10C are illustrations of a 2D image, depth map with a first scaling, and depth map with a second scaling of an imaged pill inclusive of a DPM code.

With regard to FIGS. 10A, 10B, and 10C, illustrations of a 2D image 100a, disparity map or depth map 1000b with a first scaling, and disparity map or depth map 1000c with a second scaling of an imaged pill inclusive of a DPM code are shown. In this case, the 2D image is of a pill 1001 having a DPM code 1002a, in this case "20," with a superimposed box to show character segmentation (i.e., separation of each DPM marking, such as the "2" and the "0"). Using the 2D image 1000a, or any 2D image, is difficult due to lighting conditions, reflections, and so on depending on the characteristics of the object. As shown, the lighting of the DPM code 1002a is poor as the character segmentation cannot be resolved, thereby making DPM code reading difficult or not possible. As shown in image 1000b, the character separation of the DPM code 1002b is slightly better, but cannot be fully resolved as indicated by the superimposed box 1004b. As the contrast between the nearest and farthest surfaces is increased, in this case the front of the pill as identified in the sub-box 1006 has the highest intensity and the surface 1008 on which the pill resides has lowest intensity, the individual DPM markings (e.g., "2" and "0") have darker intensities than does the front surface 1006 of the pill 1001. Hence, character segmentation can be created by using threshold levels of pixel grayscales to identify the individual characters of the DPM code. Thereafter, the DPM code may be read using a translator from machine and/or human readable characters. Hence, reading the DPM code and information represented thereby may be automated. The same principles hold true for dot peen markings or any other DPM markings. The use of color spectrum information collected by color cameras may also be used as part of a resolution and reading algorithm. It should be understood that a depth map and disparity map may be converted using a depth estimation algorithm for calculating depth of each of the pixel on the disparity map.

Figure 11:
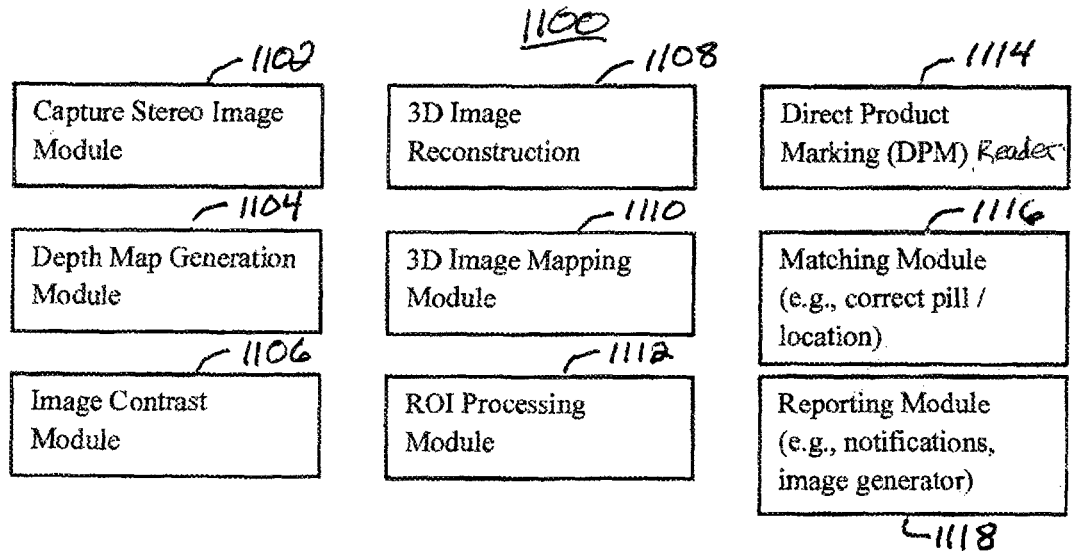
FIG. 11 is a block diagram of illustrative software modules that may be executed on a processing unit to perform image processing in capturing DPM codes on objects and reading those codes.

With regard to FIG. 11, a block diagram of illustrative software modules that may be executed on a processing unit to perform image processing in capturing DPM codes on objects and reading those DPM codes is shown. In one embodiment, at least a portion of the modules 1100 may be executed on the computing system 114 by the processing unit 116 of FIG. 1. The modules 1100 may be executed by alternative configurations of inspection systems, as well.

A capture stereo image module 1102 may be configured to capture an image of an object. The module 1102 may cause an image to be captured using a stereo imaging device, such as a pair of color linear cameras. The module 1102 may be configured to receive image data being captured in a scene in a field-of-view of the stereo imaging device, and store and/or prepare the captured image data for processing by other modules.

A depth map generation module 1104 may be configured to generate intensity values based on measured distances of points of objects from the stereo imaging device. The intensity values may range from light to dark, where closer points are light and farther points are dark. The intensity value range may be calibrated from a maximum brightness to a minimum brightness so that object identification, noise identification, and other image processing functions may be more easily performed. The module 1104 may operate to process a 2D representation of 3D data. While the use of a depth map may operate to perform such functionality, it should be understood that alternative 2D representations of 3D data are possible, as well. The depth map generation module 1104 may additionally or alternatively include a disparity generation module that generates a disparity map. In one embodiment, a transformation equation or matrix may be utilized to calculate a depth map from a disparity map and vice versa.

An image contrast module 1106 may be configured to establish contrast of pixels in conjunction with the depth map generation module 1104 (or integrated into the depth map generation module 1104). The image contrast module 1106 may be used to set brightness of each pixel within a maximum and minimum brightness range as set for a maximum and minimum range for objects to be imaged (e.g., front of object and bottom of dot peen).

A 3D image reconstruction module 1108 may be utilized to reconstruct a 3D image from the captured image data. A variety of 3D image reconstruction modules may be utilized, but ones that are specifically configured to handle data from a linear camera if a linear camera is utilized.

A 3D image mapping module 1110 may be configured to map the reconstructed 3D image onto a 3D graph based on x, y, z coordinates determined by the 3D image mapping module. By mapping specific coordinates, actual measurements may be made on pills or other objects for inspection purposes, for example. Such measurements may not be possible with depth maps or disparity maps, but transformation from depth or disparity maps to eD maps may be possible.

A region-of-interest (ROI) processing module 1112 may be optionally utilized to read and process image data from a subset of imaging pixels to assist in determining object types being imaged in alveoli or other regions of packaging or for individual DPM markings. Using ROI processing may increase speed for processing the image data as a result of having a reduced amount of image data to process (e.g., pixels inclusive of and surrounding a feature, such as a DPM marking, as opposed to an entire object on which the DPM marking is disposed). Furthermore, as a result of using a reduced data set, data transfer speed is increased.

A direct product marking module 1114 may be configured to read DPM codes on objects being imaged. The module 1114 may utilize threshold values, such as 50% and 85% intensity values, if using a depth map, to determine whether a 3D feature (e.g., groove, dot peen marking, etc.) used to form a DPM code exists for a pixel. The module 1114 may also be used to perform machine readable code translations into information, such as alphanumeric characters. An OCR reading algorithm may optionally be incorporated into the module 1114 to read and translate alphanumeric information formed on an object.

A matching module 1116 may be configured to match DPM codes or features as well as whether an object is in the correct location or not. For example, in the case of inspecting packaging with pills (or other objects) in compartments of the packaging, the module 1116 may access stored data and compare the imaged data (or data produced by any of the other modules) to determine whether the packaging is properly filled with the correct pills (or other objects) in the correct locations. The module 1116 in one embodiment may inspect that each compartment is, filled with a pill independent of color or based on color (e.g., red, green, blue), and or with a proper DPM code marked thereon. The module 1116 may generate a report signal, such as correct or incorrect object placement signals, and communicate those signals to a reporting module or controller module that may cause machinery to notify an operator or cause the machinery to perform an action, such as stop, reroute, pick up, etc., thereby providing for improved production quality. It should be understood that production of any DPM marked object may be matched for particular placement using the module 1116.

A reporting module 1118 may be configured to receive information from one or more other module and generate a report. The report may include notification signals, image generation signals, text report, numerical reports (e.g., number of pass/fail object placements), and so on. The report, in the case of a human readable report, may be displayed on an electronic display. For example, and as shown in FIG. 10C, an image of a DPM code with superimposed boxes (e.g., box 1004b of FIG. 10B or box 1004c of FIG. 10C) around one or more of the code elements on an image of object(s) being inspected may be indicative of pass (e.g., green box) or fail (e.g., red box). Also, colors, patterns, words, or any other graphics indicative of type of imaged object may be displayed in a manner that assists an operator may be produced by the module 1118. Still yet, sounds or other sensory operation may be caused to be produced by the module 1118. Summary reports with statistics of production of the objects (e.g., pills) over a time period may also be produced by the module 1118.

Figure 12:
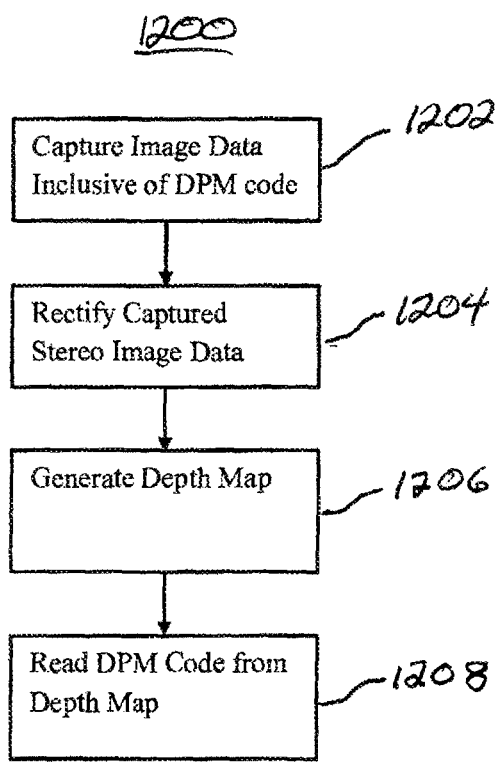
FIG. 12 is a flow diagram of an illustrative process for imaging and reading a DPM code on an object.

With regard to FIG. 12, a flow diagram of an illustrative process 1200 for imaging and reading a DPM code on an object is shown. The process 1200 may start at step 1202, where stereo image data may be captured. The stereo image data may be captured by a stereo imaging device, such as a pair of linear cameras for speed and resolution purposes, as may be specified by a high-rate production operation for production of parts, pills, or other objects on which DPM codes are marked. The DPM codes may be machine readable, human readable, or a combination thereof. The DPM codes may be formed by etching, molding, stamping, dot peening, or otherwise.

At step 1204, the process may rectify the captured stereo image data. In rectifying the captured stereo image data, the stereo images may use triangulation based on epipolar geometry to determine distance to an object. A linear transformation of the X- and Y-axes puts the images on the same plane, scaling makes the image frames be the same size, and Z rotation and skew adjustments line up the image pixel rows. The two cameras may be aligned in the factory (i.e., when assembled) to be coplanar so that searches for image or stereo matching may be performed in one-dimension rather than two. Such alignment accuracy greatly simplifies and expedites image processing in creating a depth map and/or disparity map with pixels having grayscale values, 3D map, such as a Z map with real Z coordinates of the imaged object, and other image processing. A projective transformation matrix H may also be used to enable software to further align the images in the event that the mechanical alignment is not perfect or loses its original alignment. The 3D map may be formed by applying measured data from the captured image data from the stereo imaging device. However, the use of a depth map and/or disparity map significantly reduces or eliminates reflections from the object, thereby providing good contrast from the DPM markings. And, with the use of a stereo imaging device, high resolution in the Z-axis is provided such that a range of grayscale from the front surface of an object and bottom of a DPM marking can be easily distinguished by an image processing algorithm.

At step 1206, a depth map may be generated. In generating the depth map, one or more threshold levels for intensity may be set for use in setting closest and farthest measured distance by the stereo imaging device. Thereafter, one or more threshold levels, such as 50%, may be set, where an average intensity value in a DPM marking or feature may be compared against the threshold levels. If, for example, the average intensity value is below 50%, a DPM marking is determined to exist, and if the average intensity value is above 50%, a DPM marking is determined to not exist. It should be understood that other intensity levels may be utilized, including setting multiple intensity threshold levels in the event that multiple DPM marking depths are used to encode further information in the Z-axis. By using depth to encode information in a DPM code, significantly more information may be included in a DPM code. As an example, a threshold level of 30% and 70% may be used, such that a pixel with a grayscale intensity less than 30% is considered to be a surface of the object, between 30% and 70% is considered to be a depth of half way between the surface and bottom of the DPM marking, and greater than 70% is considered to be a full-depth DPM marking. It should be understood that additional and/or alternative threshold levels, statistical methodologies, and so forth may be utilized in determining DPM codes. For example, rather than using average intensity value, a total number of pixels may be counted to determine whether more or fewer are above or below the threshold level(s).

At step 1208, a DPM code may be read from the depth map. In reading the DPM code, a transformation of the image to information may be performed. The transformation may use any OCR, DPM coding, or other machine readable transformation, such as a barcode or QR code, as understood in the art. As part of or in addition to reading at step 1208, the read (i.e., translated) DPM code may be reported to a data repository, physical report, electronic display on a graphical user interface, controller of a machine to cause the machine to cause a response by the controller (e.g., stop a conveyer belt in determining that the object is incorrect and/or remove the object from an assembly line), or otherwise in a manual, semi-automatic, or automatic manner.

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the principles of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

The previous description is of a preferred embodiment for implementing the invention, and the scope of the invention should not necessarily be limited by this description. The scope of the present invention is instead defined by the following claims.

What is claimed:

1. A method of inspection, comprising:
   capturing stereo image data inclusive of a direct part marking (DPM) code on an object;
   rectifying the captured stereo image data to produce rectified image data from the captured stereo image data;
   generating a depth map inclusive of the DPM code from the rectified image data; and
   reading the DPM code from the depth map.

2. The method according to claim 1, further comprising applying the captured stereo image data to a stereo matching map to cause a pair of images of the captured stereo image data to be in a common map coordinate system.

3. The method according to claim 1, wherein rectifying the captured stereo image data includes rectifying the captured stereo image data to produce rectified image data that is 2D data representative of a 3D image.

4. The method according to claim 1, wherein capturing stereo image data includes capturing stereo image data using a pair of linear cameras.

5. The method according to claim 4, wherein capturing stereo image data includes capturing stereo image data inclusive of color spectrum information.

6. The method according to claim 1, wherein capturing stereo image data includes capturing stereo image data using a pair of two-dimensional (2D) image sensors.

7. The method according to claim 1, further comprising configuring an illumination device to illuminate the DPM code on the object.

8. The method according to claim 7, wherein configuring the illumination device includes configuring an LED illumination device.

9. The method according to claim 8,
   wherein configuring an illumination device includes configuring an illumination device capable of selectably illuminating in one wavelength from a plurality of selectable wavelengths; and
   controlling the illumination device to a selected wavelength.

10. The method according to claim 9, further comprising:
    selecting a first selectable wavelength of the illumination device to illuminate the DPM code;
    causing the stereo imaging device to image the DPM code illuminated with the first wavelength;
    selecting a second selectable wavelength of the illumination device to illuminate the DPM code;
    causing the stereo imaging device to image the DPM code illuminated with the second wavelength; and
    selecting which of the first wavelength or second wavelength causes the DPM code to result in a depth map with higher contrast.

11. The method according to claim 1, further comprising automatically determining information content of the DPM code.

12. The method according to claim 11, further comprising using color information of the object in automatically determining the alphanumeric values.

13. An inspection system, comprising:
    a stereo imaging device configured to capture stereo image data inclusive of a direct part marking (DPM) code on an object; and
    a processing unit in communication with said stereo imaging device, and configured to:
    rectify the captured stereo image data to produce rectified image data from the captured stereo image data;
    generate a depth map inclusive of the DPM code from the rectified image data; and
    read the DPM code from the depth map.

14. The inspection system according to claim 13, wherein said processing unit is further configured to apply the captured stereo image data to a stereo matching map to cause a pair of images of the captured stereo image data to be in a common map coordinate system.

15. The inspection system according to claim 13, wherein the rectified image data is 2D data representative of a 3D image.

16. The inspection system according to claim 13, wherein the stereo imaging device includes a pair of linear cameras.

17. The inspection system according to claim 16, wherein the pair of linear cameras are color linear cameras.

18. The inspection system according to claim 13, wherein the stereo imaging device includes a pair of two-dimensional (2D) image sensors.

19. The inspection system according to claim 13, further comprising an illumination device configured to illuminate the DPM code on the object.

20. The inspection system according to claim 19, wherein the illumination device is an LED illumination device.

21. The inspection system according to claim 19, wherein the illumination device is configured to selectably illuminate in one wavelength from a plurality of selectable wavelengths.

22. The inspection system according to claim 19, wherein said processing unit is further configured to:
   select a first selectable wavelength of the illumination device to illuminate the DPM code;
   cause said stereo imaging device to image the DPM code illuminated with the first wavelength;
   select a second selectable wavelength of the illumination device to illuminate the DPM code;
   cause said stereo imaging device to image the DPM code illuminated with the second wavelength; and
   select which of the first wavelength or second wavelength causes the DPM code to result in a depth map with higher contrast.

23. The inspection system according to claim 13, wherein said processing unit is further configured to automatically determine information content of the DPM code.

24. The inspection system according to claim 23, wherein said processing unit is further configured to use color information of the object in automatically determining the alphanumeric values.

* * * * *